US012041910B2

(12) United States Patent
Hamill et al.

(10) Patent No.: US 12,041,910 B2
(45) Date of Patent: Jul. 23, 2024

(54) PET EXERCISE AND ENTERTAINMENT DEVICE

(71) Applicant: IFETCH, LLC, Austin, TX (US)

(72) Inventors: Dennis W. Hamill, Austin, TX (US); Deborah Lynn Hamill, Austin, TX (US); Lee Elizabeth Hamill, Austin, TX (US); Grant Patrick Hamill, Austin, TX (US); Katie Marcella Hamill, Austin, TX (US); Lucy Rejahl Hamill, Austin, TX (US)

(73) Assignee: IFETCH, LLC, Austin, TX (US)

( * ) Notice: Subject to any disclaimer, the term of this patent is extended or adjusted under 35 U.S.C. 154(b) by 73 days.

(21) Appl. No.: 17/982,112

(22) Filed: Nov. 7, 2022

(65) Prior Publication Data

US 2023/0240264 A1 Aug. 3, 2023

Related U.S. Application Data

(63) Continuation of application No. 16/724,898, filed on Dec. 23, 2019, now Pat. No. 11,490,595, which is a
(Continued)

(51) Int. Cl.
*A01K 15/02* (2006.01)
*A63B 69/40* (2006.01)

(52) U.S. Cl.
CPC .......... *A01K 15/025* (2013.01); *A01K 15/027* (2013.01); *A63B 69/406* (2013.01); *A63B 2208/14* (2013.01); *A63B 2220/801* (2013.01)

(58) Field of Classification Search
CPC .............. A63B 69/406; A63B 2208/12; A63B 2208/14; A63B 69/40; A63B 69/407;
(Continued)

(56) References Cited

U.S. PATENT DOCUMENTS 2,996,337 A 8/1961 Mary et al.
3,611,996 A * 10/1971 Wegner ................ A01K 15/025
124/36
(Continued)

FOREIGN PATENT DOCUMENTS

AU 540517 B2 11/1984
CN 1336838 A 2/2002
(Continued)

OTHER PUBLICATIONS

Examination Report No. 2 issued in AU2013230081, dated Mar. 22, 2017, 4 pages.
(Continued)

*Primary Examiner* — Yvonne R Abbott-Lewis
(74) *Attorney, Agent, or Firm* — Polsinelli PC (57) ABSTRACT

Implementations described and claimed herein provide systems, apparatuses, and methods for exercising and entertaining a pet. In one implementation, a pet exercise and entertainment device includes a launch funnel for launching projectiles for a pet to retrieve. The launch funnel has a feeder and a chute. The feeder is configured to receive a projectile and transport the projectile to an intake end of the chute. A sensor is configured to sense the projectile in the intake end of the chute and to command one or more motors to power up in response to sensing the projectile. An actuator is configured to release the projectile from the intake end of the chute into the launch end of the chute after a predetermined time has elapsed. One or more wheels, rotated by the one or more motors, are configured to launch the projectile from the launch end of the chute.

20 Claims, 5 Drawing Sheets

Related U.S. Application Data continuation of application No. 16/279,136, filed on Feb. 19, 2019, now Pat. No. 10,524,454, which is a continuation of application No. 16/182,332, filed on Nov. 6, 2018, now Pat. No. 10,231,437, which is a continuation of application No. 15/163,164, filed on May 24, 2016, now Pat. No. 10,117,419, which is a continuation-in-part of application No. 13/784,377, filed on Mar. 4, 2013, now Pat. No. 9,345,946, and a continuation-in-part of application No. 29/559,611, filed on Mar. 30, 2016, now Pat. No. Des. 802,856, which is a continuation-in-part of application No. 29/493,460, filed on Jun. 10, 2014, now Pat. No. Des. 797,385.

(60) Provisional application No. 61/606,835, filed on Mar. 5, 2012.

(58) Field of Classification Search
CPC .............. A63B 65/12; A63B 2063/001; A63B 47/002; A01K 15/025; A01K 5/0275; A01K 15/02; A01K 5/0291; A01K 15/027
See application file for complete search history.

(56) References Cited

U.S. PATENT DOCUMENTS

| | | | |
|---|---|---|---|
| 3,641,704 A | 2/1972 | Sims et al. | |
| 3,844,267 A * | 10/1974 | Mohr | A63B 69/40 124/78 |
| 3,901,511 A * | 8/1975 | Garbark | A63F 7/3075 273/129 R |
| 4,267,799 A * | 5/1981 | Bacon | A01K 15/025 119/61.2 |
| 4,323,047 A | 4/1982 | McIntosh et al. | |
| 4,579,340 A * | 4/1986 | Jenkins | A63B 69/0071 473/436 |
| 4,583,514 A | 4/1986 | Nozato | |
| D294,411 S | 2/1988 | Merriman | |
| 4,793,658 A | 12/1988 | Brown | |
| 4,834,060 A | 5/1989 | Greene | |
| 4,865,318 A | 9/1989 | Lehmann et al. | |
| 4,995,374 A * | 2/1991 | Black | A01K 15/025 124/32 |
| 5,029,867 A * | 7/1991 | Johnson | A63B 24/0021 473/192 |
| 5,107,820 A * | 4/1992 | Salansky | A63B 69/40 124/78 |
| D340,491 S | 10/1993 | Nass | |
| 5,417,196 A * | 5/1995 | Morrison | A63B 69/40 124/6 |
| 5,529,016 A | 6/1996 | Lonsway | |
| D391,332 S | 2/1998 | Williams | |
| 5,749,797 A | 5/1998 | Sunseri et al. | |
| 5,911,214 A | 6/1999 | Andrews | |
| 6,176,230 B1 * | 1/2001 | Thompson | A01K 15/025 124/16 |
| 6,190,271 B1 * | 2/2001 | Rappaport | A63B 69/0002 124/78 |
| D456,866 S | 5/2002 | Turpault et al. | |
| 6,443,859 B1 * | 9/2002 | Markin | A63B 69/406 124/78 |
| 6,505,576 B2 | 1/2003 | Nathanson et al. | |
| 6,684,819 B1 | 2/2004 | Locke | |
| 6,739,325 B1 | 5/2004 | Paulson | |
| 6,772,745 B2 * | 8/2004 | McEachen | A63B 69/406 124/51.1 |
| 6,817,351 B2 | 11/2004 | Keller et al. | |
| 6,875,136 B2 | 4/2005 | Leal et al. | |
| 6,877,501 B2 * | 4/2005 | Wojtkiewicz | F41B 4/00 124/78 |
| 6,880,542 B1 | 4/2005 | Johndreau et al. | |
| 7,089,720 B2 | 8/2006 | Kurt | |
| 7,111,620 B2 | 9/2006 | Johndreau et al. | |
| 7,114,465 B1 | 10/2006 | Winter | |
| 7,207,893 B1 * | 4/2007 | Louie | A63B 63/00 473/166 |
| 7,237,546 B2 | 7/2007 | Nozato | |
| 7,263,953 B2 * | 9/2007 | Sundararajan | A01K 15/025 119/61.5 |
| 7,270,080 B1 | 9/2007 | Kane | |
| 7,278,934 B2 * | 10/2007 | McBride | A63B 63/00 124/78 |
| 7,350,515 B2 | 4/2008 | Yao et al. | |
| 7,445,003 B2 | 11/2008 | Smith | |
| 7,648,431 B1 * | 1/2010 | Kinkead | A63B 63/00 473/422 |
| 7,753,375 B1 * | 7/2010 | Neal | A63F 7/26 273/317.3 |
| 7,823,574 B2 | 11/2010 | Chu | |
| D641,437 S | 7/2011 | Nugent | |
| 8,074,633 B2 * | 12/2011 | Grant | A63B 69/406 124/78 |
| 8,151,782 B2 * | 4/2012 | Huang | A63B 69/40 124/16 |
| 8,550,063 B2 | 10/2013 | Alger | |
| D719,706 S | 12/2014 | Hamill et al. | |
| 9,301,503 B1 * | 4/2016 | Arrighi | F41B 4/00 |
| 9,320,960 B1 * | 4/2016 | Ward | A01K 15/02 |
| 9,345,946 B2 | 5/2016 | Hamill et al. | |
| 9,579,553 B2 * | 2/2017 | Rehkemper | A63B 65/12 |
| D797,385 S * | 9/2017 | Hamill | D30/160 |
| D802,856 S | 11/2017 | Hamill et al. | |
| 10,117,419 B2 | 11/2018 | Hamill et al. | |
| 10,231,437 B1 | 3/2019 | Hamill et al. | |
| 10,524,454 B2 | 1/2020 | Hamill et al. | |
| 2006/0213453 A1 * | 9/2006 | Conrady | A01K 15/025 119/707 |
| 2006/0219187 A1 * | 10/2006 | Krishnamurthy | A01K 5/0275 119/719 |
| 2009/0217918 A1 | 9/2009 | McKenzie et al. | |
| 2011/0303208 A1 * | 12/2011 | Taylor | A01K 15/02 119/707 |
| 2013/0228138 A1 | 9/2013 | Hamill et al. | |
| 2017/0326428 A1 * | 11/2017 | Qian | A63B 69/406 |

FOREIGN PATENT DOCUMENTS

| | | |
|---|---|---|
| KR | 200340496 Y1 | 2/2004 |
| KR | 20050047790 A | 5/2005 |
| KR | 20100068030 A | 6/2010 |
| KR | 20110105691 A | 9/2011 |
| WO | WO-8807394 A1 | 10/1988 |

OTHER PUBLICATIONS

Examiner's Report for Australian Patent Application No. 2013230081, dated May 5, 2016, 4 pages.

Examiner's Report for Canadian Patent Application No. CA152818, mailed Mar. 27, 2014, 2 pages.

Examiner's Requisition issued in CA2870535, dated Jan. 18, 2018, 3 pages.

Examiner's Requisition issued in CA2870535, dated May 26, 2017, 3 pages.

Examiner's Search Report for European Patent Application No. 13758071.8, dated Sep. 2, 2015, 8 pages.

Extended European Search Report from European Patent Application No. 17200107.5, May 7, 2018, 28 pages.

Final Office Action for U.S. Appl. No. 13/784,377 dated Aug. 19, 2015, 11 pages.

Final Office Action for U.S. Appl. No. 29/448,669 mailed May 22, 2014, 10 pages.

Final Office Action for U.S. Appl. No. 29/493,460 dated Dec. 31, 2015, 18 pages.

Final Office Action for U.S. Appl. No. 29/493,460 mailed Dec. 22, 2016, 8 pages.

First Office Action for Chinese Patent Application No. 2013800225901, mailed Aug. 17, 2015, 25 pages.

(56) References Cited

OTHER PUBLICATIONS

First Office Action for Japanese Patent Application No. 2014-561036, dated Nov. 1, 2017, 4 pages.
http://andy-projects.blogspot.com/2012/10/diy-automatic-dog-ball-thrower.html, "DIY Automatic Dog Ball Thrower".
https://nanotray.com/2010/09/19/catch-that-ball/, "Catch that ball".
https://www.tenniswarehouse.com.au/godoggo-sensor.html, "GoDogGo G3/G4 Sensor—Spare Part".
https://www.youtube.com/watch?v=4PcL6-mjRNk, "Jerry needs no help playing with his ball."
https://www.youtube.com/watch?v=4STcHXp-CzAt=43s, "Fetchbot DIY Ball Launcher for Dogs".
https://www.youtube.com/watch?v=b4ogJeqZhGl , "Modified Automatic Ball Launcher V2.1.0".
https://www.youtube.com/watch?v=BEvIHZKhlyMt=140s , "Tennis Ball Launcher Deconstructed".
https://www.youtube.com/watch?v=HL0Yr29lyjk , "Home made pitching machine and feeder".
https://www.youtube.com/watch?v=i2WkUJm6ICg, "CSULB Mechanical Engineering Senior Design Project (Automatic Dog Ball Thrower) Video #1".
https://www.youtube.com/watch?v=15YhROKXR6M, "A Dog & A Ball Machine".
https://www.youtube.com/watch?v=IgyK0C_oHPIt=105s ,"Automatic Ball Launcher V2.0".
https://www.youtube.com/watch?v=mLYJrsjBArw , "CSULB Mechanical Engineering Senior Design Project (Automatic Dog Ball Thrower) video #2".
https://www.youtube.com/watch?v=My6fOUXO35Q, "Automatic Dog Ball Launcher".
https://www.youtube.com/watch?v=nATzcOWNuAc, "Automatic Dog Ball Thrower, Dog Tested!".
https://www.youtube.com/watch?v=V9UOcUKazSA&t=210s, "Fetch-O-Matic DIY Ball Launcher".
https://www.youtube.com/watch?v=W9JjUAxNv04 , "Automatic Ball Launcher on Make: Live ep07".
https://www.youtube.com/watch?v=W9JjUAxNv04&t=149s , "Automatic Ball Launcher on Make: Live ep07".
https://www.youtube.com/watch?v=wuvPTJgxblg, "GoDogGo Fetch Machine Automatic Ball Launcher Thrower for Dogs".
https://www.youtube.com/watch?v=zFvGZNomy71 , "Dog and ball machine".
International Preliminary Report on Patentability for the Application No. PCT/US2013/029124, dated Sep. 18, 2014, 8 pages.
International Search Report and Written Opinion for International Application No. PCT/US2013/029124, mailed Jun. 18, 2013, 11 pages.
Non-Final Office Action for U.S. Appl. No. 13/784,377 dated May 1, 2015, 17 pages.
Non-Final Office Action for U.S. Appl. No. 29/448,669 mailed Feb. 21, 2014, 15 pages.
Non-Final Office Action for U.S. Appl. No. 29/493,460 dated Jul. 11, 2016, 8 pages.
Non-Final Office Action for U.S. Appl. No. 29/493,460 mailed May 29, 2015, 12 pages.
Notice of Allowance for U.S. Appl. No. 13/784,377 dated Jan. 22, 2016, 17 pages.
Notice of Allowance for U.S. Appl. No. 29/448,669 mailed Aug. 6, 2014, 10 pages.
Notice of Allowance for U.S. Appl. No. 29/493,460 mailed May 4, 2017,13 pages.
Notice of Final Rejection issued in KR1020147025129, dated Jun. 10, 2020, 1 page.
Notice of Third Party Submission for United States U.S. Appl. No. 13/784,377 mailed Feb. 20, 2014, 12 pages.
Notification of Reason for Refusal issued in KR1020147025129, dated Feb. 28, 2020, 9 pages.
Notification of Reason for Refusal issued in KR1020147025129, dated Jul. 31, 2019, 6 pages.
Office Action with Restriction Requirement for U.S. Appl. No. 13/784,377 dated Jan. 13, 2015, 7 pages.
Opinion issued in KR1020147025129, dated Sep. 30, 2019, 15 pages.
Request for Rectification for Chinese Patent Application No. 201330426178.9, dated Apr. 22, 2014, 6 pages.
Response to Examiner's Report for Canadian Patent Application No. CA152818, mailed Jul. 28, 2014, 8 pages.
Response to Examiner's Report for European Patent Application No. 13758071.8, dated Apr. 15, 2015, 8 pages.
Response to Examiner's Report No. 1 for Australian Patent Application No. 2013230081 dated Mar. 13, 2017, 22 pages.
Response to Examiner's Report No. 2 for Australian Patent Application No. 2013230081 dated Apr. 13, 2017, 11 pages.
Response to Examiner's Second Report for Australian Patent Application No. 351288, dated Mar. 4, 2015, 3 pages.
Response to Final Office Action for U.S. Appl. No. 13/784,377 dated Dec. 21, 2015, 9 pages.
Response to Final Office Action for U.S. Appl. No. 29/448,669 dated Jul. 29, 2014, 10 pages.
Response to Final Office Action for U.S. Appl. No. 29/493,460 dated Apr. 8, 2016, 13 pages.
Response to First Office Action for Chinese Patent Application No. 2013800225901, dated Dec. 30, 2015, 13 pages.
Response to First Office Action for Japanese Patent Application No. 2014-561036 filed Apr. 29, 2017, 17 pages.
Response to Non-Final Office Action for U.S. Appl. No. 13/784,377 dated Aug. 3, 2015, 6 pages.
Response to Non-Final Office Action for U.S. Appl. No. 29/448,669 dated May 15, 2014, 11 pages.
Response to Non-Final Office Action for U.S. Appl. No. 29/493,460 dated Sep. 29, 2015, 5 pages.
Response to Office Action with Restriction Requirement for U.S. Appl. No. 13/784,377 dated Mar. 13, 2015, 12 pages.
Response to Second Office Action for Chinese Patent Application No. 2013800225901 dated Sep. 26, 2016, 7 pages.
Response to Third Office Action for Chinese Patent Application No. 2013800225901 dated Apr. 18, 2017, 10 pages.
Rule 71(3) Intent to Grant European Patent Application No. 13758071.8 mailed May 31, 2017, 26 pages.
Second Examiner's Report for Australian Patent Application No. 351288, mailed Dec. 16, 2014, 2 pages.
Second Office Action for Chinese Patent Application No. 2013800225901, dated May 9, 2016, 23 pages.
Third Office Action for Chinese Patent Application No. 2013800225901 mailed Feb. 3, 2017, 23 pages.

* cited by examiner

PET EXERCISE AND ENTERTAINMENT DEVICE

CROSS-REFERENCE TO RELATED APPLICATIONS

The present application is a continuation of U.S. patent application Ser. No. 16/724,898, filed Dec. 23, 2019, which is a continuation of U.S. patent application Ser. No. 16/279,136, filed Feb. 19, 2019, which is a continuation of U.S. patent application Ser. No. 16/182,332, filed Nov. 6, 2018 (the '332 application), which is a continuation of U.S. patent application Ser. No. 15/163,164, filed May 24, 2016 and now U.S. Pat. No. 10,117,419 issued Nov. 6, 2018 (the '164 application), which is continuation-in-part of U.S. patent application Ser. No. 13/784,377, filed on Mar. 4, 2013 and now U.S. Pat. No. 9,345,946, issued May 24, 2016, which claims benefit of priority under 35 U.S.C. § 119 to U.S. Provisional Patent Application No. 61/606,835, filed on Mar. 5, 2012. The '164 application is further a continuation-in-part of U.S. Design patent application No. 29/559,611, filed on Mar. 30, 2016, now Pat. No. D802,856 issued Nov. 14, 2017, which is a continuation-in-part of U.S. Design patent application No. 29/493,460, filed on Jun. 10, 2014, now Pat. No. D797,385 issued Sep. 12, 2017. Each of these applications is specifically incorporated by reference herein in its entirety.

BACKGROUND

Pets need exercise to ensure they are physically and mentally healthy. The amount of exercise needed depends on the species, breed, age, and health of the pet. However, most pets generally need exercise daily. Pets may receive the exercise they need through various activities, including walking, running, and playing. Many of these activities require human involvement and interaction to occur. For example, "fetch" is a popular activity for exercising a dog, which involves a human throwing a ball for the dog to retrieve and/or catch and return to the human. However, a human is often not available or not willing to participate in activities to ensure that a pet receives the exercise and/or entertainment it needs.

Some pet exercise devices launch projectiles for a pet to catch and/or retrieve. However, many of these devices require a human to load the device with projectiles to initiate the exercise activity and again once the device launches all the projectiles that were loaded into the device. Further, many of these devices continually launch projectiles until the device launches all the loaded projectiles or the device is switched off. With such devices, a pet may lose interest in the activity before the device launches all the loaded projectiles, resulting in an unnecessary depletion of the device's power as well as a mess of unretrieved projectiles in the exercise area. Additionally, with such devices, the timing of the launches is not tailored to the individual pet engaging in the activity, which may result in the pet being hit by a projectile or a pet not being able to keep up with the pace of the launches. Further, many of these devices can be tipped over by the pet such that the device does not function properly.

It is with these observations in mind, among others, that various aspects of the present disclosure were conceived and developed.

SUMMARY

Implementations described and claimed herein address the foregoing problems by providing systems, apparatuses, and methods for exercising and entertaining one or more pets through pet controlled interactive fetching. In one implementation, an interactive fetching device for a pet comprises a housing having a shell with at least one curved surface extending from a top to a bottom. A launch opening defined in the shell. A planar surface is disposed at the bottom of the housing, and a housing opening is disposed at the top of the housing. A feeder is disposed in the housing opening. The feeder is configured to receive a projectile from the pet and direct the projectile into an interior of the shell through an opening defined by an intake end of a chute. At least one sensor is configured to sense the projectile within the shell. The projectile is automatically launched from a launch end of the chute through the launch opening for the pet to retrieve after a predetermined time has elapsed from when the at least one sensor sensed the projectile within the shell. Other implementations are also described and recited herein.

BRIEF DESCRIPTION OF THE DRAWINGS

Example implementations are illustrated in referenced figures of the drawings. It is intended that the implementations and figures disclosed herein are to be considered illustrative rather than limiting.

DETAILED DESCRIPTION

Aspects of the present disclosure involve pet exercise and entertainment and associated systems, apparatuses, and methodologies to provide pet controlled exercise and entertainment. In one particular aspect, a pet exercise and entertainment device is configured to launch projectiles, including without limitation, balls of various sizes and types, disks, toys, food, treats, and other objects. The exercise and entertainment device includes a housing having a substantially flat base, a substantially round shell, a receiving portion configured to receive projectiles, and a launching portion configured to launch projectiles. The housing has generally smooth surfaces, which combined with the overall shape of the housing prevents a pet from easily tipping the exercise and entertainment device over. The exercise and entertainment device further includes a feeder for transporting projectiles from the receiving portion to an intake end of a chute. Either a pet or an owner may place one or more projectiles into the feeder.

Once a projectile is in the intake end of the chute, a switch senses the projectile, thereby commanding one or more motors to power up and triggering release operations. During the release operations, the projectile is held in the intake end of the chute for a pre-determined time, for example, for the motors to power up. After the pre-determined time has elapsed, the release operations command an actuator to release the projectile from the intake end of the chute into a launch end of the chute. The launch end of the chute includes one or more wheels, rotated by the motors, to launch the projectile out of the launching portion of the housing for one or more pets to catch and/or retrieve. After launching the projectile, the motors are commanded to power down.

Starting the motors after the switch senses a projectile in the intake end of the chute and stopping the motors after launching the projectile optimizes the power source of the exercise and entertainment device. Further, the timing of the launches may be tailored to the individual pet engaging in the activity. For example, the pet may control if and when the exercise and entertainment device launches a projectile by choosing when to drop a projectile to the receiving portion for each launch. Allowing the pet to control if and when the exercise and entertainment device launches a projectile reduces human involvement in the activity. Specifically, a human is not needed to load the exercise and entertainment device with projectiles to initiate and continue the exercise activity. After a human turns on the exercise and entertainment device, the pet may control the exercise activity substantially without human involvement.

It will be appreciated that the exercise and entertainment device may be used by or with one or more pets and/or one or more humans. Stated differently, one or more pets may use the exercise and entertainment device with or without human involvement. For example, after the exercise and entertainment device is turned on, the pet may place one or more projectiles into the feeder, retrieve a projectile after launch, and place another projectile into the feeder, as needed. Conversely, a human may place one or more projectiles into the feeder for the pet to retrieve and return to the human or the feeder. Finally, the exercise and entertainment device may include features to assist in the training of a pet to use the exercise and entertainment device, as discussed herein.

Figure 1:
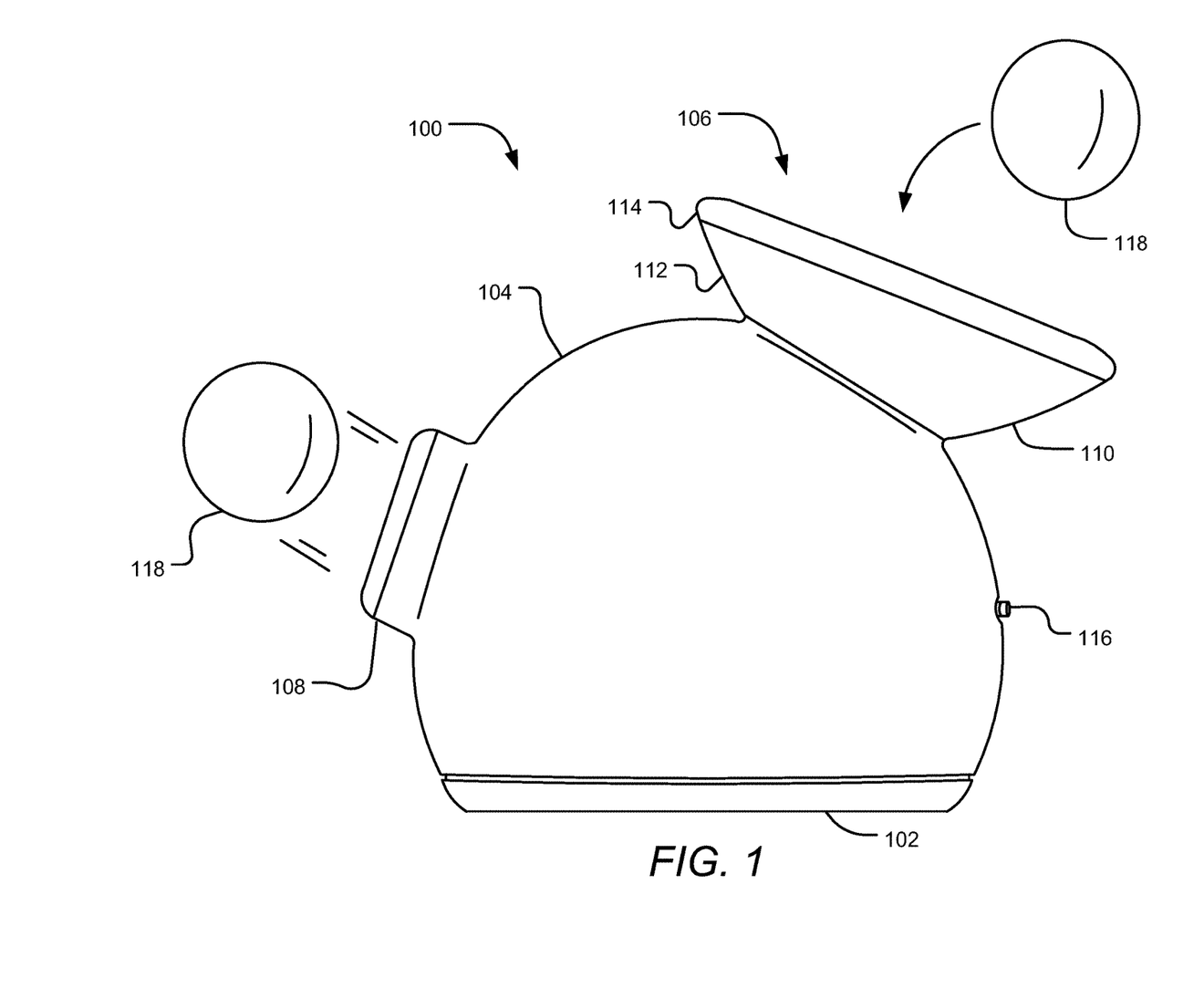
FIG. 1 illustrates an example pet exercise and entertainment device for pet controlled interactive fetching.

FIG. 1 illustrates an example pet controlled exercise and entertainment device 100. The exercise and entertainment device 100 is configured to launch projectiles, including without limitation, balls of various sizes and types, disks, toys, food, and other objects, for a pet to catch and/or retrieve. For example, the projectile may be a miniature tennis ball approximately 40 mm in size.

In one implementation, the exercise and entertainment device 100 includes a housing, which protects the interior components of the exercise and entertainment device 100. The housing may have generally smooth surfaces, which prevent a pet from becoming tangled on the exercise and entertainment device 100 or from easily tipping the exercise and entertainment device 100 over. However, other surface textures, irregularities, and/or projections are contemplated. Further, the housing may have a decorative finish including colors, patterns, designs, and/or logos. In one implementation, the housing includes a base 102, a shell 104, a receiving portion 106, and a launching portion 108.

The base 102 is substantially flat to allow for placement of the exercise and entertainment device 100 on an indoor or outdoor surface for use. In one implementation, the base 102 is removably coupled to the shell 104 to provide access to the interior of the exercise and entertainment device 100.

The shell 104 covers the internal components of the exercise and entertainment device 100. In one implementation, the shell 104 is substantially rounded. However, other shapes, including, but not limited to, rectangular, conical, triangular, elliptical, hexagonal, hemispherical, hemiellipsoidal, cubical, pyramidal, and cylindrical, are contemplated. In one implementation, the shell 104 is coupled to the receiving portion 106 and the launching portion 108.

The receiving portion 106 is configured to receive projectiles into the interior of the exercise and entertainment device 100 for launching. In one implementation, the receiving portion 106 protrudes from the shell 104 at an angle to form a generally conical shape. The receiving portion 106 includes a lower side 110, disposed proximate to the base 102, and an upper side 112, disposed distal to the base 102. In one implementation, the lower side 110 extends further from the shell 104 than the upper side 112, permitting smaller pets to access to the receiving portion 106 and preventing projectiles from falling out of the receiving portion 106. Further, the receiving portion 106 may include a lip 114 extending towards the general center of the receiving portion 106 to prevent projectiles from bouncing out.

The launching portion 108 is configured to launch projectiles from the exercise and entertainment device 100. In one implementation, the launching portion 108 protrudes from the shell 104 to form a generally cylindrical shape. The launching portion 108 is disposed away from the receiving portion 106. For example, the launching portion 108 may be disposed on the opposite side of the shell 104 as the receiving portion 106, which ensures that the pet will not be hit with a projectile while dropping a projectile into the receiving portion 106. The location of the receiving portion 106 forces the pet to go to the rear of the exercise and entertainment device 100, so the pet will likely not be hit with the projectile when the exercise and entertainment device 100 launches the projectile.

The housing may further include one or more features to assist in the training of a pet to use the exercise and entertainment device 100. For example, the housing may include a ledge, platform, drawer, or other compartment to hold treats for use in rewarding the pet during training. Such features may be fixed or removable and may be disposed inside or outside of the housing.

In one implementation, the exercise and entertainment device 100 further includes a power switch 116 for providing electrical power to the exercise and entertainment device 100. The exercise and entertainment device 100 may be powered by various power sources, including but not limited to, batteries, an AC power outlet, and/or solar power. In one implementation, the exercise and entertainment device 100 is powered by one or more batteries disposed along the base 102 in the shell 104. The weight of the batteries stabilizes the exercise and entertainment device 100 and prevents a pet from easily tipping the exercise and entertainment device 100 over.

In an example implementation, a pet drops a ball 118 into the receiving portion 106, from which the ball 118 is transported interior of the housing. The exercise and entertainment device 100 senses the ball 118, and in response, the exercise and entertainment device 100 powers up for launch. The exercise and entertainment device 100 holds the ball 118 in the interior of the housing until a pre-determined time has elapsed. In one implementation, the pre-determined time corresponds to the amount of time it takes for the exercise and entertainment device 100 to power up after the exercise and entertainment device 100 senses the ball 118. For example, the motors may take up to 4 seconds to power up after the ball 118 is sensed. In another implementation, a human manually sets the pre-determined time. In still another implementation, the pre-determined time is updated to adapt to the intervals at which the pet drops the ball 118 into the receiving portion 106. Finally, in yet another implementation, the pre-determined time represents the amount of time it takes an average pet to move to a retrieving position (e.g., the pet is ready to retrieve a projectile) after the pet drops the ball 118 into the receiving portion 106. The pre-determined time further prevents multiple projectiles from launching at once in the event that a pet drops multiple projectiles into the receiving portion 106 together. After the pre-determined time has elapsed, the exercise and entertainment device 100 launches the ball 118 through the launching portion 108. After launching the ball 118, the exercise and entertainment device 100 powers down. Powering up after sensing the ball 118 in the exercise and entertainment device 100 and powering down after launching the ball 118 optimizes the power source of the exercise and entertainment device 100. In one implementation, when the exercise and entertainment device 100 is not launching the ball 118, the power to the motors is off and the interior electrical components are in a low-power listening mode to conserve power. The pet retrieves the ball 118, and if the pet wants to continue the exercise activity, the pet brings the ball 118 or another projectile to the receiving portion 106 for launch.

Figure 2:
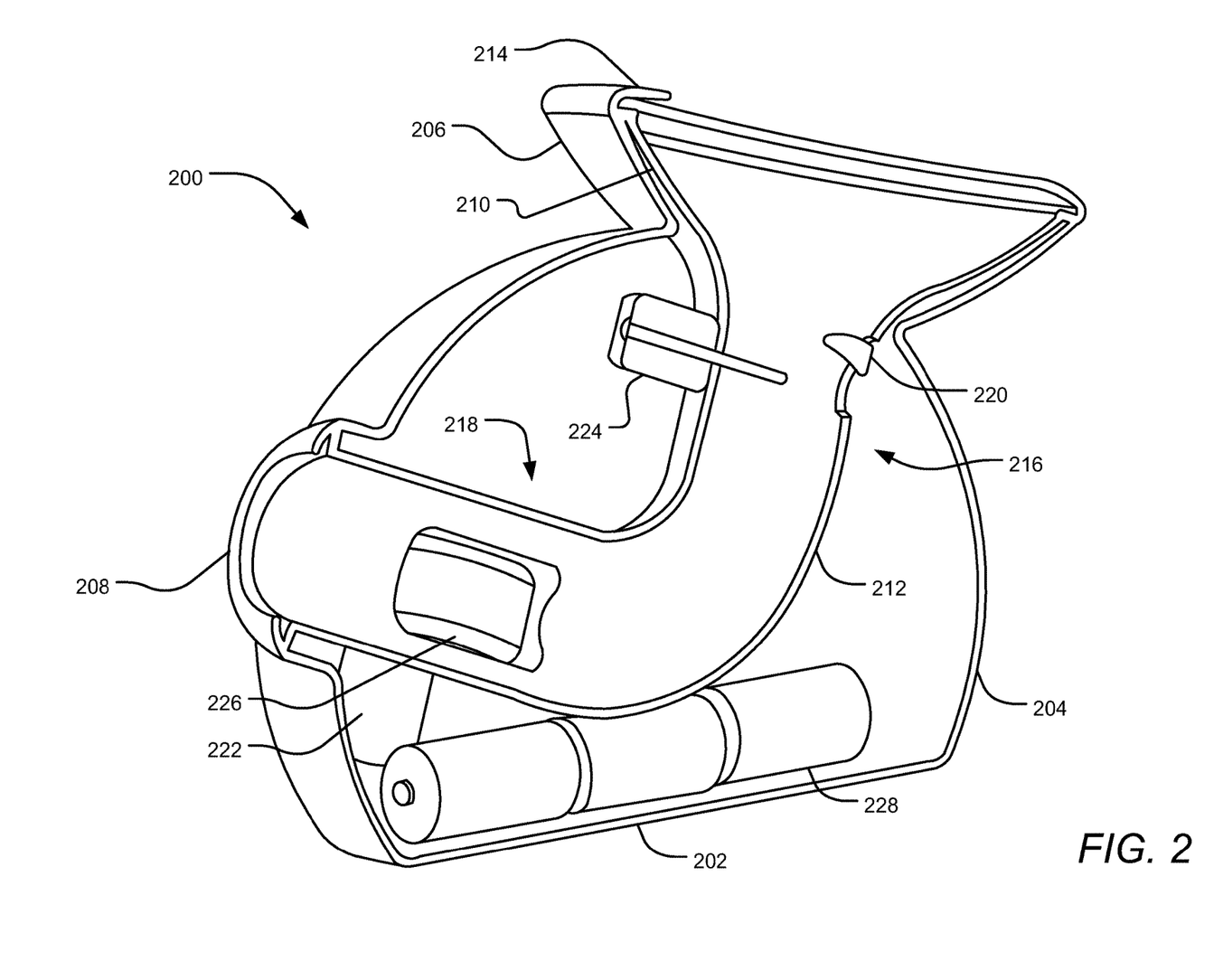
FIG. 2 is a perspective cross-sectional view of an example pet exercise and entertainment device showing the internal components.

FIG. 2 illustrates a perspective cross-sectional view of an example pet controlled exercise and entertainment device 200. The exercise and entertainment device 200 is configured to launch projectiles. In one implementation, the exercise and entertainment device 200 includes a housing for protecting the interior components of the exercise and entertainment device 200. The housing may be made from a thermoplastic polymer, such as polycarbonate. However, other materials, including but not limited to metal, wood, ceramics, rubber, foam, and other injection molded plastics are contemplated.

In one implementation, the housing includes a base 202, a shell 204, a receiving portion 206, and a launching portion 208. The base 202 is substantially flat to allow for placement of the exercise and entertainment device 200 on an indoor or outdoor surface for use. The shell 204 covers the internal components of the exercise and entertainment device 200. The receiving portion 206 and the launching portion 208 provide support for a launch funnel, which is configured to receive and launch projectiles. The launch funnel includes a feeder 210 and a chute 212. The launch funnel may be made from a thermoplastic polymer, such as polycarbonate. However, other materials, including but not limited to metal, wood, ceramics, rubber, foam, and other injection molded plastics are contemplated.

In one implementation, the receiving portion 206 protrudes from the shell 204 at an angle to form a generally conical shape. The receiving portion 206 provides support for the feeder 210, which has a smaller diameter relative to the receiving portion 206. A pet drops a projectile into the feeder 210, and the feeder 210 uses gravity to transport the projectile into the chute 212. The chute 212 may have, for example, a diameter of approximately 44 mm. In one implementation, the receiving portion 206 includes a lip 214, extending towards the center of the receiving portion 206 partially over the feeder 210, to prevent projectiles from bouncing out of the feeder 210.

The chute 212 includes an intake end 216 and a launching end 218. In one implementation, the intake end 216 receives a projectile from the feeder 210. A switch 220 (e.g., a momentary switch, optical switch, or other sensing mechanism) senses the projectile in the intake end 216, thereby commanding one or more motors 222 to power up. Due to the view, FIG. 2 illustrates one motor, but there may be an additional motor, for example, disposed opposite the shown motor. In one implementation, the motors 222 are configured such that they generate little noise, so the exercise and entertainment device 200 is not frightening to the pet or disruptive. For example, to reduce noise and vibrations, the motors 222 may be mounted in isolation, such as on elastomeric grommets or in an elastomeric sleeve, and one or more wheels 226 may be mounted on the shafts of the motors 222 on one side and supported by braces on the other side.

Further, after sensing the projectile, the switch 220 initiates release operations, which hold the projectile in the intake end 216 for a pre-determined time. In one implementation, the pre-determined time corresponds to the amount of time it takes for the motors 222 to power up, which may correspond to the time it takes the one or more wheels 226 to spool up to a designated RPM throw speed. The designated RPM throw speed is based on, for example, the time the wheels 226 take to spool-up, the weight of the wheels 226, and the desired distance for launching the projectile. For example, the motors may take approximately up to 4 seconds to power up. In yet another implementation, a human manually sets the pre-determined time. In still another implementation, the pre-determined time is updated each launch to adapt to the intervals at which the switch 220 senses a new projectile is received. The pre-determined time prevents multiple projectiles from launching at once in the event that a pet drops multiple projectiles into the feeder 210 together. Further, the switch 220 may be a multi-position input switch that is configured to control multiple speeds of the motors 222 and launch distances of the projectiles. Stated differently, the switch 220 may control and dynamically change the launch distance of the projectiles by changing the speed of the motors 222.

After the pre-determined time has elapsed, the release operations command an actuator 224 to release the projectile from the intake end 216. In one implementation, the actuator 224 is a linear solenoid actuator, configured to transform the command from an electrical signal into a pull motion on an armature to release the projectile from the intake end 216.

After release, gravity pulls the projectile from the intake end 216 along the length of the chute 212 to the launching end 218. In one implementation, the chute 212 curves from the intake end 216 to the launching end 218, such that the projectile is launched from the exercise and entertainment device 200 at an arc, allowing the pet to retrieve the projectile. For example, a projectile may drop in the chute 212 approximately 91 mm before reaching the curved portion of the chute 212, and subsequent to the one or more wheels 226 engaging the projectile, the projectile is transported in the chute 212 approximately 80 mm before the projectile is launched. In one implementation, the exercise and entertainment device 200 launches the projectile at an angle that creates lift for the projectile in an indoor environment such that the projectile travels approximately 20 feet along a low, gentle arc. For example, the exercise and entertainment device 200 may launch the projectile at an angle of approximately 22 degrees, relative to the plane upon which the exercise and entertainment device 200 sits. The one or more wheels 226 partially protrude into the launch end 218 and are rotated by the one or more motors 222. Again, due to the view, FIG. 2 illustrates one wheel, but there may be an additional wheel, for example, disposed opposite the shown wheel. In one implementation, the wheels 226 are made from a robust material, including, without limitation, rubber, plastic, and foam. The wheels 226 may be approximately 66 mm in diameter. In one implementation, the wheels 226 are spaced from each other, such that the wheels 226 compress the projectile slightly to grip the projectile for launching. For example, the wheels 226 may be spaced approximately 100 mm from the center of one of the wheels 226 to the center of the other. The rotation of the wheels 226 launches the projectile from the launch end 218 out the launching portion 208 for the pet to catch and/or retrieve. In one implementation, the motors 222 rotate the wheels 226 at approximately 4,900 to 14,000 RPM, which launches a projectile approximately 20 feet. After the projectile is launched, the switch 220 causes the motors 222 to power down.

The exercise and entertainment device 200 may be powered by various power sources, including but not limited to, one or more batteries, an AC power outlet, solar power, and/or other power source. In one implementation, the exercise and entertainment device 200 is powered by six 1.5 V C cell batteries 228 disposed along the base 202 in the shell 204. Due to the view, FIG. 2 illustrates three batteries, but there may be three additional batteries, for example, disposed opposite the shown batteries. The weight of the batteries 226 stabilizes the exercise and entertainment device 200 and prevents a pet from easily tipping the exercise and entertainment device 200 over. In one implementation, the base 202 is removably coupled to the shell 204 to provide access to the interior of the exercise and entertainment device 200.

Figure 3:
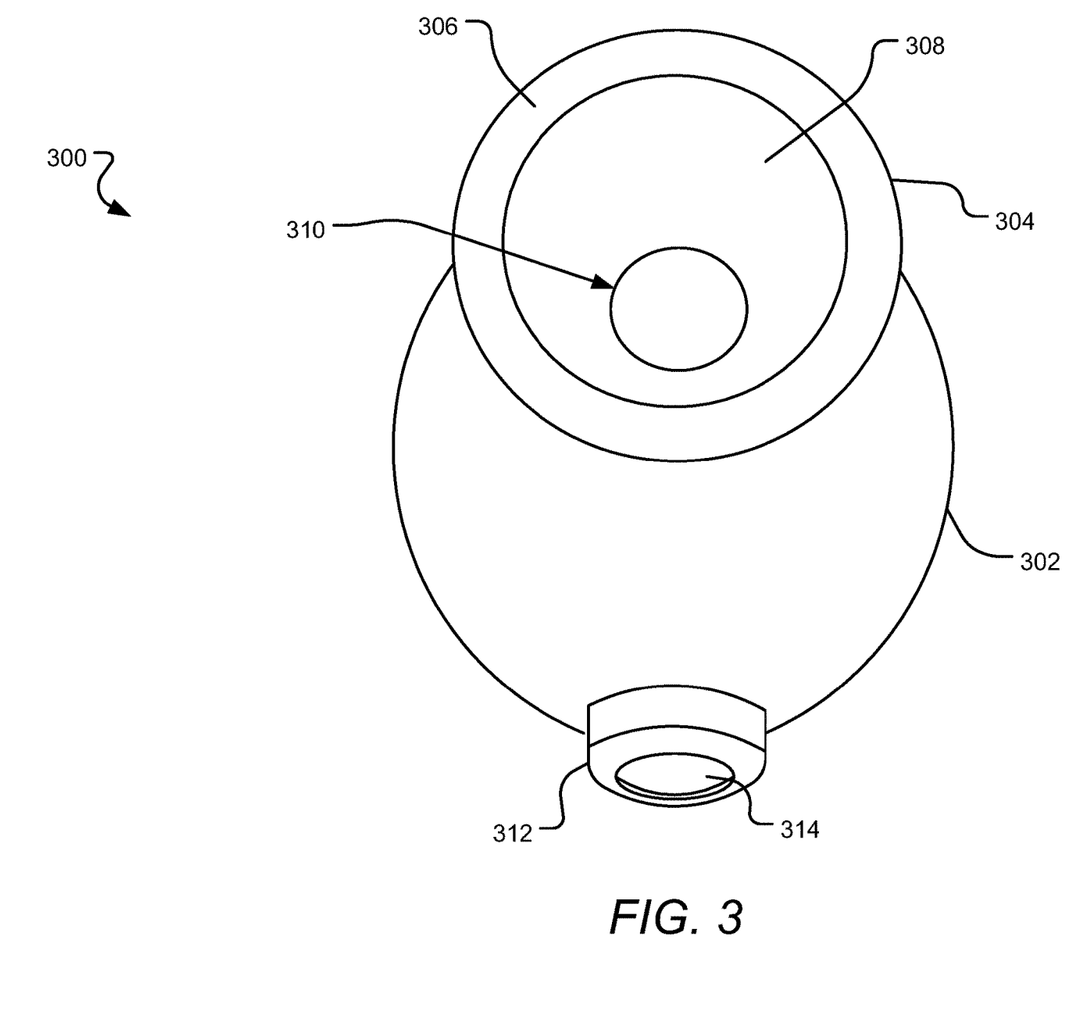
FIG. 3 shows a top view of an example pet exercise and entertainment device.

FIG. 3 illustrates a top view of an example pet controlled exercise and entertainment device 300. The exercise and entertainment device 300 is configured to launch projectiles. In one implementation, the exercise and entertainment device 300 includes a housing, which protects the interior components of the exercise and entertainment device 300. The housing may have generally smooth surfaces. However, other surface textures, irregularities, and/or projections are contemplated. Further, the housing may have a decorative finish including colors, patterns, designs, and/or logos. In one implementation, the housing includes a shell 302, a receiving portion 304, and a launching portion 312.

The shell 302 covers the internal components of the exercise and entertainment device 300. In one implementation, the shell 302 is substantially round. However, other shapes, including, but not limited to, rectangular, conical, triangular, elliptical, hexagonal, hemispherical, hemiellipsoidal, cubical, pyramidal, and cylindrical, are contemplated.

The receiving portion 304 is configured to receive projectiles into the interior of the exercise and entertainment device 300 for launching, and the launching portion 312 is configured to launch projectiles from the exercise and entertainment device 300. In one implementation, the launching portion 312 protrudes from the shell 302 to form a generally cylindrical shape, and the receiving portion 304 protrudes from the shell 302 at an angle to form a generally conical shape.

The receiving portion 304 is positioned relative to the launching portion 312. In one implementation, the launching portion 312 is disposed away from the receiving portion 304. For example, the launching portion 312 may be disposed on the opposite side of the shell 302 as the receiving portion 304, which ensures that the pet will not be hit with a projectile while dropping a projectile into the receiving portion 304. In another implementation, the receiving portion 304 is disposed on an upper side of the shell 302, distal to a base of the housing (not shown), and the launching portion 312 is disposed on a lower side of the shell 302, proximal to the base.

The receiving portion 304 and the launching portion 312 provide support for a launch funnel, which is configured to receive and launch projectiles. The launch funnel includes a feeder 308 and a chute. The chute includes an intake end 310 and a launch end 314.

The receiving portion 304 provides support for the feeder 308, which has a smaller diameter relative to the receiving portion 304. A pet drops a projectile into the feeder 308, and the feeder 308 uses gravity to transport the projectile into the intake end 310. In one implementation, the receiving portion 304 includes a lip 306, extending towards the center of the receiving portion 304 partially over the feeder 308, to prevent projectiles from bouncing out of the feeder 308.

The launching portion 312 provides support for the launching end 314. After receiving the projectile from the feeder 308, the intake end 310 releases the projectile into the launching end 314, which launches the projectile for the pet to catch and/or retrieve.

Figure 4:
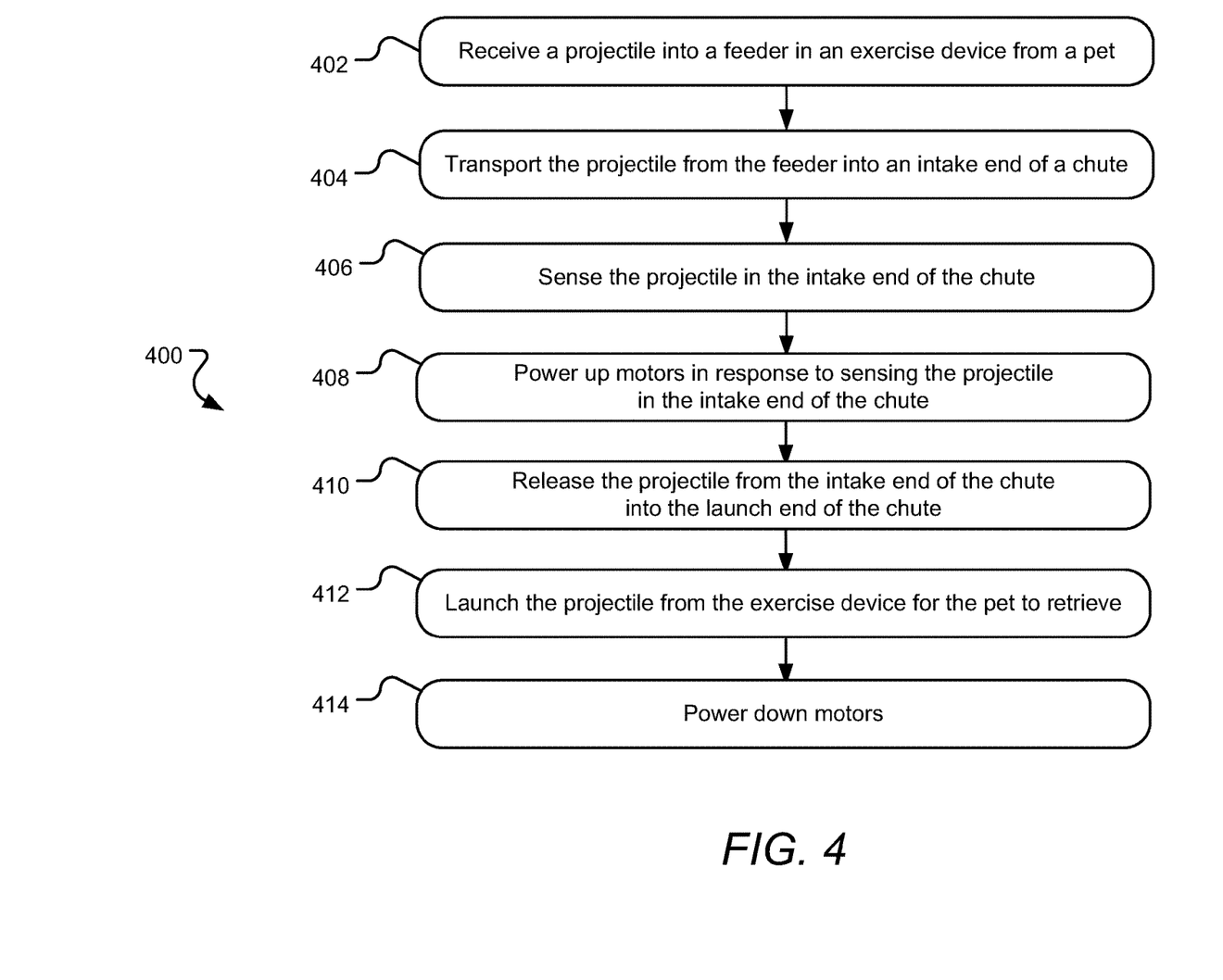
FIG. 4 illustrates example operations for providing interactive exercise and entertainment for one or more pets.
Figure 5A:
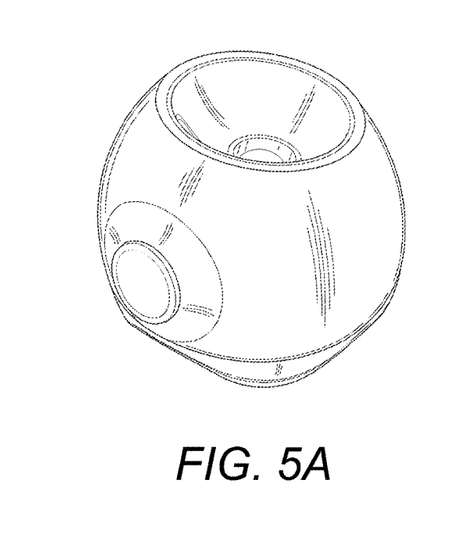
FIGS. 5A-5D illustrate an isometric view, a back perspective view, a side view, and a bottom perspective view, respectively, of another example pet exercise and entertainment device pet controlled interactive fetching.
Figure 5B:
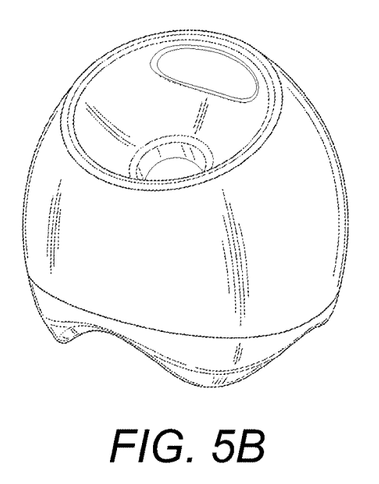
Figure 5C:
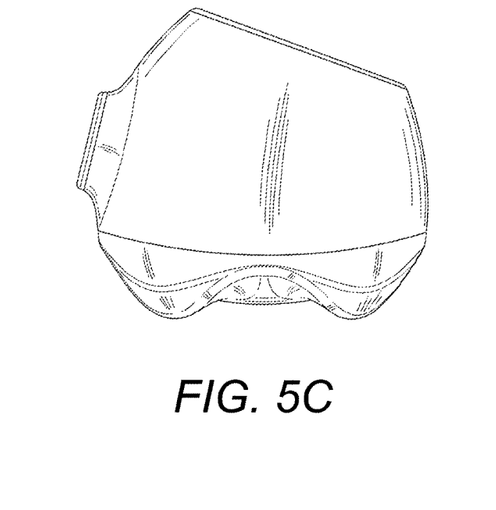
Figure 5D:
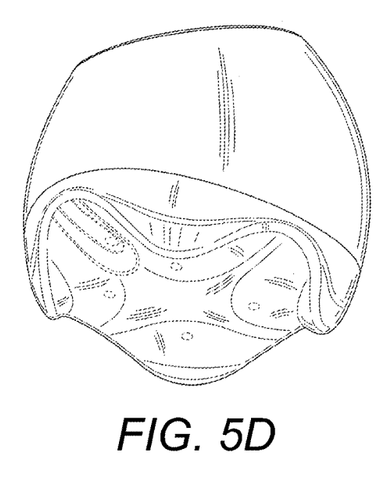

FIG. 4 illustrates example operations 400 for providing pet controlled exercise and entertainment. A receiving operation 402 receives one or more projectiles into a feeder in an exercise and entertainment device from one or more pets or a humans. In one implementation, the feeder is supported by a receiving end of a housing. In another implementation, a launch funnel includes the feeder and a chute.

A transporting operation 404 transports the projectile from the feeder into the interior of the exercise and entertainment device. In one implementation, the feeder uses gravity to transport the projectile from the feeder into an intake end of the chute. In another implementation, the projectile is mechanically transported to the interior of the exercise and entertainment device from the feeder.

A sensing operation 406 senses the projectile in the intake end of the chute. In one implementation, the sensing operation 406 senses the projectile using a switch, such as a momentary switch. However, other sensing devices are contemplated.

A responding operation 408 powers up one or more motors in response to the sensing operation 406. In one implementation, the responding operation 408 receives a command from the switch to power up the one or more motors, and the responding operation 408 powers up the one or more motors in preparation of launch.

A releasing operation 410 releases the projectile from the intake end of the chute into a launch end of the chute. The releasing operation 410 releases the projectile in response to the sensing operation 406. In one implementation, the releasing operation 410 releases the projectile after a predetermined time has elapsed since the sensing operation 406. In another implementation, the releasing operation 410 commands an actuator to release the projectile from the intake end of the chute. However, other releasing mechanisms are contemplated. In one implementation, the releasing operation 410 uses gravity to pull the projectile from the intake end of the chute to the launch end of the chute. In another implementation, the releasing operation 410 mechanically transports the projectile from the intake end of the chute to the launch end of the chute.

A launching operation 412 launches the projectile from the exercise and entertainment device for the pet to retrieve. In one implementation, the launching operation 412 launches the projectile from the launching end of the chute. In another implementation, the launch end of the chute is supported by a launching portion of the housing. After the pet catches and/or retrieves the projectile, the pet may return the projectile or another projectile to the exercise and entertainment device, thereby repeating the operations 400.

After the launching operation 412, a powering down operation 414 powers down the motors until another projectile is sensed in the sensing operation 406. The powering down operation 414 optimizes the power source of the exercise and entertainment device. In one implementation, the powering down operation 414 comprises turning off or reducing the power to the motors and setting the interior electrical components in a low-power listening mode to conserve power.

Turning to FIGS. 5A-5D, another example pet exercise and entertainment device 500 is shown, which may function and include many interior components and other features that are substantially the same as those described above with respect to FIGS. 1-4.

In the present disclosure, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. An interactive fetching device providing interactive fetching of a projectile for a pet, the interactive fetching device comprising:
    a housing including a receiving portion and a launching portion;
    a feeder disposed in the receiving portion, the feeder configured to receive the projectile and direct the projectile into an interior of the housing;
    at least one sensor configured to sense the projectile in the interior; and
    at least one motor powered up in response to the at least one sensor sensing the projectile, the at least one motor configured to cause the projectile to be launched from the launching portion after a predetermined time has elapsed from when the at least one sensor sensed the projectile, the projectile automatically launched from the launching portion through a launch opening for the pet to retrieve following the at least one motor being powered up.

2. The interactive fetching device of claim 1 further comprising:
    a chute disposed within the housing and including an intake end and a launching end, the intake end configured to receive the projectile from the feeder.

3. The interactive fetching device of claim 2, wherein the projectile is released from the intake end after a predetermined time has elapsed from when the at least one sensor sensed the projectile and transported to the launching end via gravity.

4. The interactive fetching device of claim 1 further comprising:
    one or more wheels configured to be rotated by the at least one motor to launch the projectile from the launching portion.

5. The interactive fetching device of claim 1, wherein the housing further includes a base, the base including a planar surface.

6. The interactive fetching device of claim 1, wherein the predetermined time is based on time needed for the at least one motor to rotate one or more wheels to a throw speed to launch the projectile a desired distance.

7. The interactive fetching device of claim 1, wherein the projectile is one or more of a ball, a disk, a toy, and food.

8. The interactive fetching device of claim 1, wherein the housing further includes a shell coupled to the receiving portion.

9. The interactive fetching device of claim 1, wherein the receiving portion includes a lip extending towards a center of the receiving portion.

10. A method for providing interactive fetching of a projectile for a pet, the method comprising:
    receiving the projectile at a receiving portion of a housing;
    directing the projectile through a feeder disposed in the receiving portion to an interior of the housing;
    sensing the projectile in the interior using at least one sensor;
    powering up at least one motor in response to sensing the projectile; and
    launching the projectile through a launching portion in the housing after a predetermined time has elapsed from when the at least one sensor sensed the projectile.

11. The method of claim 10 further comprising:
    powering down the at least one motor.

12. The method of claim 11, wherein powering down the at least one motor comprises one of turning off or reducing power to the at least one motor.

13. The method of claim 12, wherein powering down the at least one motor further comprises setting electrical components in a low-power listening mode.

14. The method of claim 10 further comprising:
    releasing the projectile from an intake end of a chute; and
    transporting the projectile to a launching end of the chute via gravity.

15. The method of claim 10, wherein the projectile is launched through the launching portion in the housing using one or more wheels rotated by the at least one motor.

16. The method of claim 10, wherein the housing further includes a base, the base including a planar surface.

17. The method of claim 10, wherein the at least one sensor is at least one of a momentary switch or an optical switch.

18. The method of claim 10, wherein the projectile is one or more of a ball, a disk, a toy, and food.

19. The method of claim 10, wherein the housing further includes a shell coupled to the receiving portion.

20. The method of claim 10, wherein the receiving portion includes a lip extending towards a center of the receiving portion.

* * * * *